Nov. 10, 1931. L. REINOLD 1,831,752
MANUFACTURE OF HAND GRIPS COMPRISING FITTINGS OF MOLDED MATERIAL
Filed Nov. 4, 1929

Inventor:
Louis Reinold

Patented Nov. 10, 1931

1,831,752

UNITED STATES PATENT OFFICE

LOUIS REINOLD, OF TOURNUS, FRANCE, ASSIGNOR TO MANUFACTURE METALLURGIQUE DE TOURNUS, OF TOURNUS, FRANCE

MANUFACTURE OF HAND-GRIPS COMPRISING FITTINGS OF MOLDED MATERIAL

Application filed November 4, 1929, Serial No. 404,799, and in France April 29, 1929.

The invention relates to the manufacture of hand-grips, handles, etc., comprising a lining formed by a mass molded directly around a central framework. It relates more particularly to the manufacture of saucepan handles employed for example for aluminium or other saucepans and provided with an insulating layer of plastic material molded around a central core and comprised between an extension of the member called a foot which serves for attaching the handle on the container or else a member rigid with a foot, on the one hand and the end member of the handle, generally ring-shaped or else a member extending from the ring on the other hand so that the foot and the end member or the portions extending these parts form the surfaces of contact or bounding surfaces of the layer.

As stated above the invention may be applied in a general manner to all handgrips comprising or capable of comprising a layer of material molded directly around a central core and comprised between two bounding end surfaces. It is adapted for use for example on the handles of coffee-pots or other cooking utensils, the handles of knives and also on doorhandles, jug handles, etc.

Attempts have already been made to provide the handles of saucepans with insulating covering layers of molded plastic materials, for example plastic materials having a base of synthetic resins need no longer be formed by slipping a ready made covering sleeve over the central core as in the case of wooden and other protectors but on the contrary by molding the plastic material around the central rod of the core in the hot state and under pressure.

In these attempts serious disadvantages were discovered which were of such a nature as to prevent the widespread use of this type of manufacture. In fact, the molded plastic material always undergoes a more or less important amount of shrinkage which, even when it is small, results in a lack of contact between the end faces of the molded fitting and the bounding surfaces of the members between which the fitting is mounted, that is to say in the case of saucepans, the faces of the foot and the end ring shaped member. The clearance existing between the fitting and the end member may it is true be taken up by screwing this member on the central rod of the core but the clearance produced between the fitting and the foot by the shrinkage of the plastic material continues of necessity to remain.

It follows in the first place that these spaces which exist either on one side only or on both sides of the fitting give the whole arrangement of the handle an unfinished appearance which give the impression of defective manufacture. In the second place the central core is exposed at the points where the spaces exist between the fitting and the surfaces bounding the latter and consequently the zones thus uncovered are not protected and are of less strength than the other parts of the handle so that chiefly on account of the existence of the zone of smaller strength near the foot of the handle, the latter becomes unavoidably distorted and the saucepan becomes rapidly unserviceable.

The object of the invention is to permit the fitting to be molded directly upon the central core of the handles, handgrips, etc., in such a way that the terminal faces of the fittings will be in perfect contact without any intervening space with the parts of the mounting bounding the said fitting, the handles being consequently noticeable for their perfect finish.

With this object in view the invention provides improvements consisting essentially in the combination on the one hand of engaging or locking means provided upon or rigid with the members between which the fitting must be comprised when molded directly around the central core connecting the said members together, these engaging means permitting the mass of molded material to become virtually integral with the said members and on the other hand of means for mounting one at least of the members upon the central core or for mounting the core itself in such a way as to permit the said members to be spaced a varying distance apart, these varying spacing mounting means for the members permitting the said members to be moved towards each other when the material is molded around the central armature and forms one body with these members by taking advantage of the shrinkage of the molded material and through this shrinkage itself, thus ensuring a perfect final contact between the end faces of the fitting and the surfaces bounding the latter.

The invention also consists by way of embodiment, in a saucepan handle having a central rod rigid with the foot of the handle and forming the core which is characterized by the feature that means are provided upon the foot and the end member of the handle for rendering the mass formed by the fitting of plastic material rigid with these members, the said means consisting for example in recesses or grooves formed upon extension pieces of the surfaces bounding the fitting which are intended to be embedded in the fitting and in combination with the said means, fitting means permitting the end member to move towards the foot at the moment of the shrinkage of the mass and as a result of this shrinkage itself the latter means consisting for example in a conical sleeve fit of the central rod in the end member.

The invention will be more clearly understood from the following description of a constructional example of a saucepan handle. In this description reference will be made to the accompanying drawings, in which.

Figure 1:
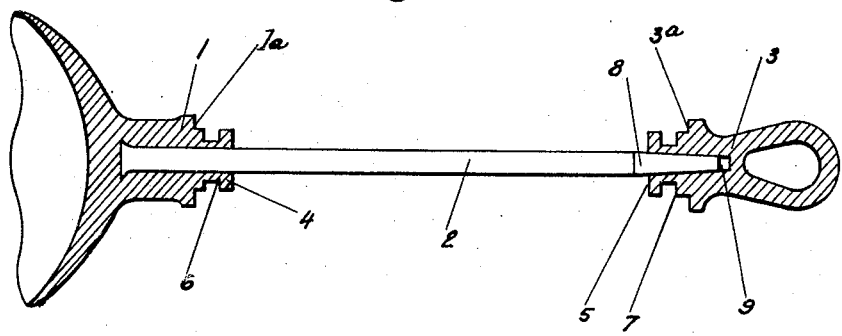
Figure 1 is a horizontal axial section of a saucepan handle mounting with the parts of the mounting constructed and assembled with a view to carrying the invention into effect, the handle being shown before molding the fitting of plastic material and with the assumption that the central core is viewed in elevation.
Figure 2:
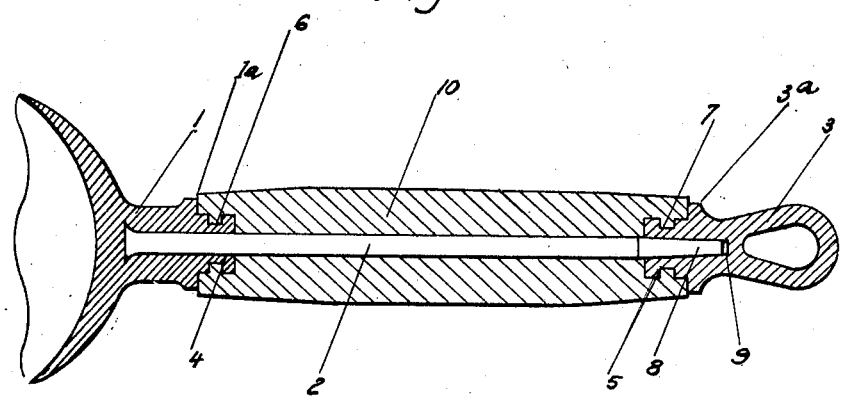
Figure 2 is a similar view of the same mounting in the completed state after the molding and shrinkage and fitting of the mold of plastic material, the central core being again shown in elevation.

In these figures, 1 is the foot of the handle, that is to say the member adapted to be secured to the outer wall of the saucepan; 2 is a core-forming rod embedded during casting in the foot and 3 is an end member terminating in a ring serving for hanging up the utensil. The end of the rod 2' which is embedded in said foot is preferably slightly enlarged, as shown in the drawing.

According to the invention the members 1 and 3 the surfaces 1ª and 3ª of which form the bounding surfaces of the fitting of molded material, comprise upon extension portions 4 and 5 respectively, which are adapted to be embedded in the fitting, recesses or grooves 6 and 7 respectively forming the rigid connecting means permitting the mass of the fitting to engage with the members 1 and 3.

These members 1 and 3 may as usual be of any section, for example round or oval, while their extension portions 4 and 5 may be of any shape such as cylindrical or prismatic. In combination with these means a mounting for the end member 3 is provided which permits this member to move towards the member 1, this mounting consisting in the example shown of a sleeve fit with friction obtained by a conical part 8 provided upon the end of the central core forming rod 2 and a corresponding conical bore 9 formed in the end member 3, the arrangement being such that before molding the fitting a sufficient space exists between the end of the conical part 8 and the end of the bore 9.

It will be understood that by this combination of means, when fitting 10, which is obtained by molding plastic material in a hot state under pressure around a central core forming rod 2 and between the bounding surfaces 1ª and 3ª shrinks, the member 3 will be compelled by the pull exerted upon it by the shrinkage of the material and on account of the rigid connection of the foot 1 and the secure engagement or locking of the material upon the members 1 and 3, the grooves 6 and 7 of which it fills, to move towards the members 1 by sliding further over the conical part 8 of the central member 2. I intend to use bakelite for the fitting 10, although any desired moldable insulating material may be substituted therefor, which will have some shrinkage during the hardening process.

Consequently in this way the distance between the surfaces 1ª and 3ª bounding the fitting 10 will become adjusted automatically to the length of the fitting, the end faces of which are thus brought into perfect contact with the surfaces 1ª and 3ª.

It is to be clearly understood that in order to carry the invention into effect use may be made without going outside the scope of the invention of equivalent means to those described. For example the end member 3 may if required be permanently fixed upon the central core forming rod 2, as is the foot 1; while the rod 2 will then be formed of two sections sliding frictionally over each other.

What I claim is:

1. A handle for a utensil comprising a foot piece and an end piece, a central core-forming rod embedded at one end in said foot-piece and extending to said end piece, said foot-piece and end-piece having locking recesses, and a cover of shrinkable plastic material molded into said recesses, so that as said plastic material hardens said end piece will be drawn towards said foot piece.

2. A handle for a utensil comprising a cast metal foot-piece, a core rod embedded at one end in said foot-piece and having its other end tapered, an end piece having a recess in which said tapered end fits, said foot piece and end piece having recesses or grooves, and a cover of shrinkable plastic material molded into said recesses or grooves, so that as said plastic material hardens said end piece will be drawn towards said foot-piece.

3. A handle for a utensil comprising a cast metal foot-piece, a core rod having an enlarged end embedded in said foot-piece and having its other end tapered, an end piece having a recess in which said tapered end fits, said foot piece and end piece having recesses or grooves, and a cover of shrinkable plastic material molded into said recesses or grooves, so that as said plastic material hardens said end piece will be drawn towards said foot piece.

In testimony whereof I affix my signature.

LOUIS REINOLD.